United States Patent [19]

Taylor

[11] Patent Number: 4,977,918
[45] Date of Patent: Dec. 18, 1990

[54] PRESSURE/VACUUM RELIEF VALVE

[76] Inventor: Julian S. Taylor, 8300 SW 8th, Oklahoma City, Okla. 73128

[21] Appl. No.: 498,503

[22] Filed: Mar. 26, 1990

[51] Int. Cl.$^5$ .............................................. F16K 17/40
[52] U.S. Cl. ......................................... 137/70; 137/493
[58] Field of Search ................. 137/68.1, 70, 71, 493, 137/493.9

[56] References Cited

U.S. PATENT DOCUMENTS

| | | | |
|---|---|---|---|
| 2,309,813 | 2/1943 | Whiting | 137/493 X |
| 3,042,057 | 7/1962 | Zargdrager et al. | 137/7 P |
| 4,570,657 | 2/1986 | Niers | 137/493 X |
| 4,724,857 | 2/1988 | Taylor | 137/71 X |
| 4,787,409 | 11/1988 | Taylor | 137/70 |

*Primary Examiner*—John C. Fox
*Attorney, Agent, or Firm*—Robert K. Rhea

[57] ABSTRACT

A combination pressure/vacuum relief valve is formed by a closed end cylindrical body having a first port providing communication with a fluid containing vessel and a second port providing communication with the atmosphere. A piston valve within the cylinder is normally seated on a valve seat between the ports with the respective end portions of the piston rod projecting through the closed ends of the cylinder. Each end of the cylinder is provided with a cage supporting a pressure responsive fuse rod interposed between the outwardly projecting end of the piston rod and the opposite end of the cage. When the fluid pressure within the vessel falls below or exceeds a predetermined value, such pressure axially moves the piston valve in a respective unseating direction for providing communication between the interior of the fluid vessel with the atmosphere.

10 Claims, 2 Drawing Sheets

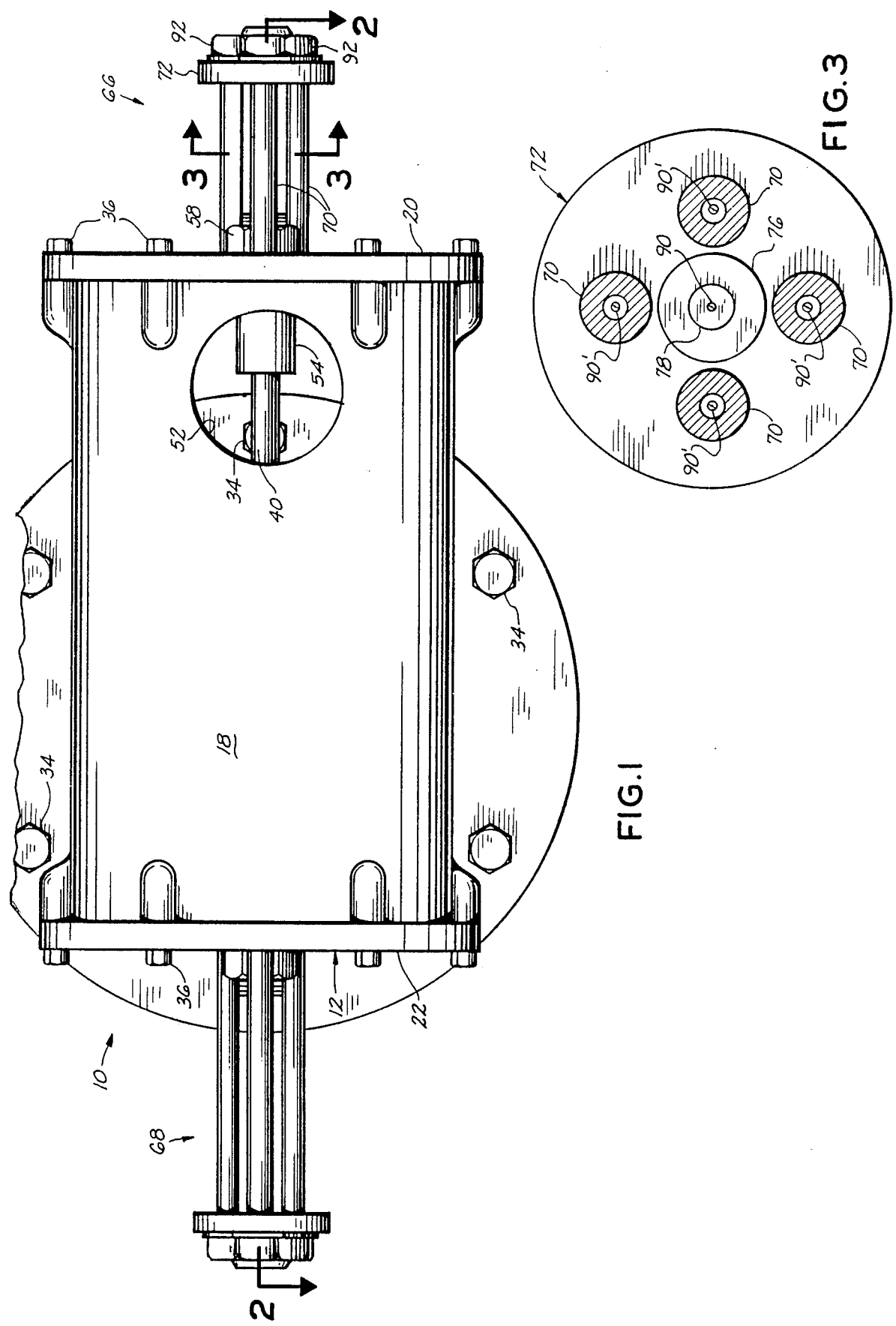

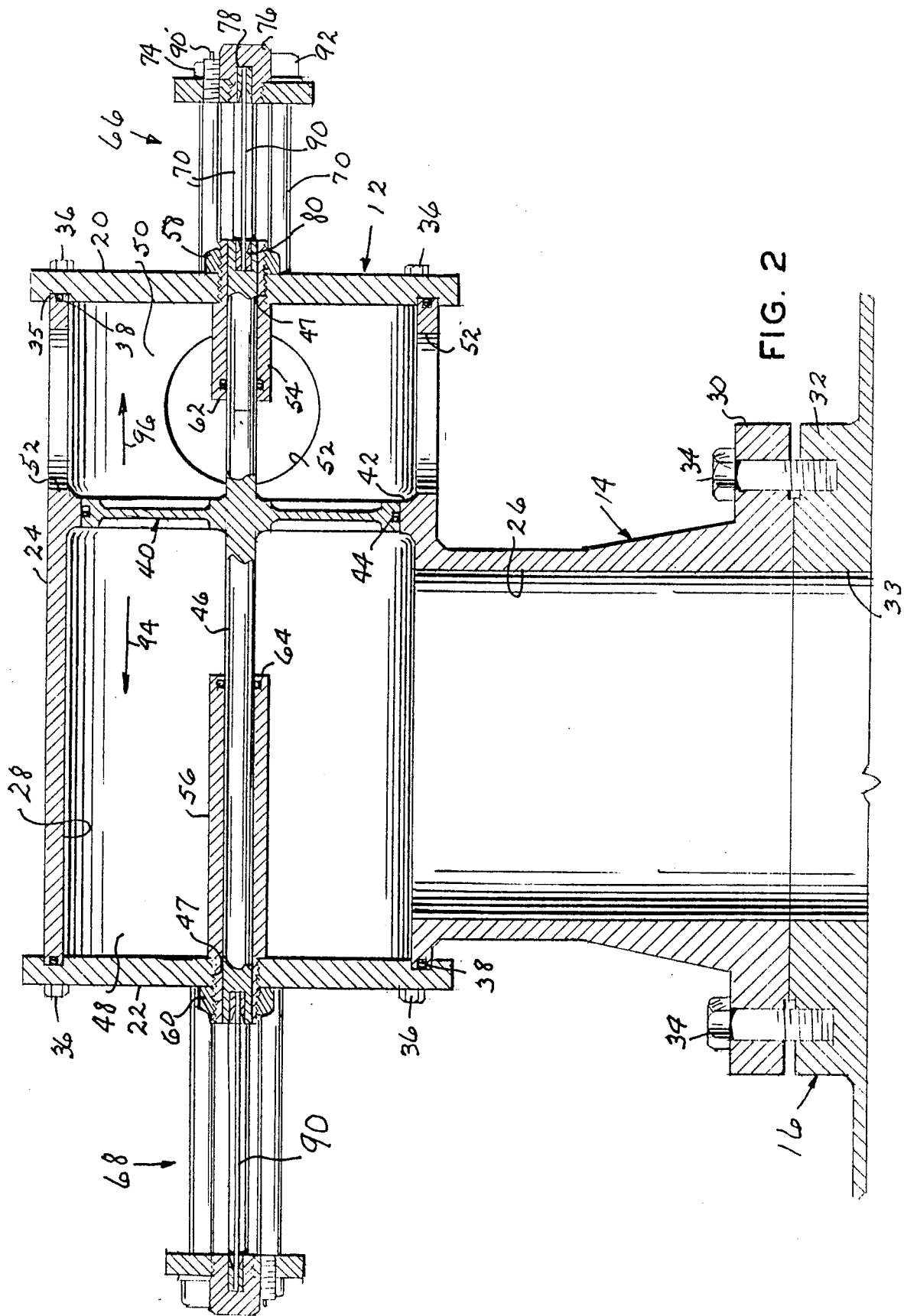

1

PRESSURE/VACUUM RELIEF VALVE

BACKGROUND OF THE INVENTION

1. Field of the invention.

This invention relates to relief valves and more particularly to a combination double acting valve responsive to vacuum and/or pressure to prevent excess vacuum or pressure of fluid in a vessel.

2. Description of the prior art.

Relief valves are well known in industry and are calibrated to open at a predetermined pressure However I do not know of any prior patent disclosing a combination double acting relief valve biased open by fluid pressure above or below a predetermined value in a vessel.

This invention accomplishes this purpose.

SUMMARY OF THE INVENTION

An elongated closed end cylinder is mounted on and communicates at one end portion with an opening in a fluid containing vessel. The other end portion of the cylinder communicates with the atmosphere through wall apertures. A piston valve divides the cylinder and normally seals with an annular inwardly directed flange intermediate the cylinder ends. The piston valve is provided with a piston rod axially projecting at its respective ends through the respective cylinder closing end wall.

A cage having an open end and a closed end is axially connected at its open end with a nut adjacent the outer surface of the cylinder respective closed end wall maintaining a piston valve stop in position on the respective end portion of the piston rod.

An elongated wire-like fuse is interposed between the respective end of the piston rod and the closed end of the respective cage. Each fuse is calibrated to fail under a predetermined pressure and normally maintains the piston valve in its sealed position with the cylinder When the fluid pressure within the vessel falls below or exceeds a predetermined value, such pressure axially moves the piston valve in a respective seal breaking direction for communicating the interior of the fluid vessel with the atmosphere.

The principal object of this invention is to provide a combination pressure/vacuum relief valve for monitoring the fluid pressure within a vessel and maintaining it between selected high and low pressure values.

BRIEF DESCRIPTION OF THE DRAWINGS

FIG. 1 is a top view of the pressure vacuum valve;

FIG. 2 is a fragmentary vertical cross sectional view taken substantially along the line 2—2 FIG. 1; and, FIG. 3 is a vertical cross sectional view, to a larger scale, taken substantially along the line 3—3 of FIG. 1.

The reference numeral 10 indicates the device as a whole comprising a valve body 12 connected at one end portion with a lateral flanged neck 14 in turn connected with a fluid containing vessel 16.

The valve body comprises an elongated cylinder 18 having its respective ends closed by disc-like end members 20 and 22.

The flanged neck 14 is integrally formed with the sleeve wall 24 and the bore 26 of the flanged neck is diametrically substantially equal with respect to the inner wall surface or bore 28 of the sleeve. The flange 30 of the neck is connected with the flange 32 around the opening 33 of the fluid containing vessel by bolts 34.

Each of the end members 20 and 22 are provided with an annular groove 35 adjacent their periphery and in the surface facing the sleeve wall 24 for receiving an end edge portion of each respective end of the sleeve. The end members 20 and 22 are rigidly connected with the sleeve by bolts 36. 0-rings 38 in the respective end edge of the sleeve wall 24 insure a seal with the respective cylinder closing end wall 20 and 22.

The cylinder contains a disc-like piston 40 having its periphery normally sealing with an inwardly projecting annular flange 42 on the inner wall 28 of the sleeve The periphery of the piston similarly being provided with an 0-ring 44 to insure a fluid tight seal with the flange 42. The piston is provided with a piston rod 46 projecting axially through the respective end wall 20 and 22. The piston 40 divides the cylinder into two compartments 48 and 50. For convenience, the compartment 48 is referred to as a vacuum compartment and the compartment 50 is referred to as a pressure compartment.

The sleeve wall surrounding the compartment 50 is provided with a plurality of circumferentially equally spaced apertures 52 providing communication between the compartment 50 and the atmosphere. Q Piston stop sleeves 54 and 56 surround respective end portions of the piston rod 46. One end portion of each piston rod stop is externally threaded and is cooperatively received threadedly by each cylinder end wall bore 47. Nuts 58 and 60 respectively connected with the outer end of the piston rod maintain the opposite end 62 and 64 of the respective piston stop in selected spaced relation with respect to the piston when seated on the cylinder inner wall flange 42 for the purposes presently believed apparent.

A pair of cages 66 and 68 axially project outwardly of the respective cylinder end wall 20 and 22 in coaxial relation with respect to the outwardly projecting end portion of the piston rod and its surrounding piston stop. Except for their longitudinal length, the cages 66 and 68 are substantially identical and in the interest of brevity, only the cage 66 is described in detail.

As best illustrated by FIG. 3, the cage 66 comprises a plurality (four in the example shown) of bolts 70 which are connected at one end portion in circumferential equally spaced relation with the periphery of the nut 58. The other end portions of the bolts 70 project through a cage disc 72 and are secured thereto by a like plurality of nuts 74. A stud boltlike fuse holder 76 is axially connected threadedly with the cage disc 72.

The adjacent, outwardly projecting end of the piston rod 46 and inwardly directed end surface of the fuse cap are centrally bored coaxially to form sockets cooperatively receiving centrally bored fuse end holders or supports 78 and 80, respectively. An elongated wire-like pin or pressure responsive fuse 90 axially extends between and is received at its respective end portions in the bores of the fuse end holders 78 and 80.

Each of the bolts 70 are axially drilled from their disk Q connected end for receiving one of the pins 90' as spare parts. The pins being retained within each bolt 70 by plastic nut caps 92.

Operation

In operation, assuming the device is connected as described hereinabove with the vessel 16 in which the fluid therein is preferably maintained at 14.7 psi The pins 90 being calibrated to fail or bend in a collapsing action by axial movement of the piston rod in response to a predetermined pressure value, for example, one pound below or above the 14.7 psi. If the fluid pressure in the vessel 16 falls below a predetermined value, then the reduction in pressure permits atmospheric pressure in the pressure chamber 50 to move the piston 40 in the direction of the arrow 94 collapsing the pin 90 in the cage assembly 68 and opening the chamber 48 to atmosphere.

On the other hand, if the pressure in the vessel 16 rises above the predetermined value then such pressure moves the piston 40 in the direction of the arrow 96 into the pressure chamber 50, thus permitting atmospheric pressure to enter both the vacuum chamber 48 and the interior of the vessel 16 by the collapse of the pin 90 in the cage assembly 66.

When the fluid vessel pressure problem has been corrected, the piston valve 40 is easily reset by manually removing the fuse end holder 76 from the respective cage, removing the damaged pin 90 and the released pin in the opposite cage. The piston and its rod are axially moved to a piston sealing position with the flange 42 and a new pin is removed from a respective one of the bolts 70 and placed in position with the replaced fuse holding cap 76.

Obviously the invention is susceptible to changes or alterations without defeating its practicability. Therefore, I do not wish to be confined to the preferred embodiment shown in the drawings and described herein.

I claim:

1. A pressure/vacuum relief valve for a fluid containing vessel, comprising:
    an elongated cylinder having a wall and having end walls closing the cylinder ends, one end portion of said cylinder wall having a first port communicating with the fluid in said vessel and the other end portion of said cylinder having a second port communicating with the atmosphere;
    a piston in said cylinder normally sealed with the inner wall surface thereof between the first and second ports;
    a piston rod axially projecting from said piston through the respective cylinder end wall;
    elongated cage means having a closed end and an open end axially connected with the respective cylinder end wall around the respective end portion of the piston rod; and,
    pressure responsive elongated pin means interposed between the respective end of the piston rod and the closed end of the respective cage for normally maintaining the piston in valve closed position.

2. The relief valve according to claim 1 in which the cage means includes:
    a plurality of elongated circumferentially spaced rod members axially secured at one end as a unit to each said end wall; and,
    a cage disk axially secured to the other end portions of said rod members.

3. The relief valve according to claim 2 and further including:
    portion guide coaxially supported by said a pin means end piston rod and said cage disk.

4. The relief valve according to claim 2 and further including:
    piston stop means within said cylinder for limiting the movement of said piston toward the respective end of said cylinder 5. The relief valve according to claim 4 and further including:
    valve seat means including an annular inwardly projecting flange on the inner wall surface of said cylinder between its first and second ports for seating with the periphery of said piston.

6. A pressure/vacuum relief valve for a fluid containing vessel, comprising:
    valve body means including an elongated closed end cylinder having a first wall port communicating with the fluid in said vessel and having a second wall port communicating with the atmosphere;
    annular valve seat means on the inner wall surface of said cylinder between the first and second ports;
    a piston valve in said cylinder normally seated on said valve seat means;
    a piston rod axially projecting from said piston valve through the respective cylinder closed end;
    elongated cage means having a closed end and having an open end axially connected with the respective cylinder closed end around the respective end portion of the piston rod; and,
    pressure responsive fuse rod means interposed between the respective end of the piston rod and the closed end of the respective cage for normally maintaining the piston valve seated.

7. The relief valve according to claim 6 in which the cage means includes: a plurality of elongated circumferentially spaced rod members
    axially secured at one end as a unit to each said end wall; and,
    a cage disk axially secured to the other end portions of said rod members.

8. The relief valve according to claim 7 and further including: a fuse rod end portion guide coaxially supported by said piston rod and said cage disk.

9. The relief valve according to claim 7 and further including:
    piston stop means within said cylinder for limiting the movement of said piston toward the respective end of said cylinder.

10. The relief valve according to claim 9 and further including:
    valve seat means including an annular inwardly projecting flange on the inner wall surface of said cylinder between its first and second ports for seating with the periphery of said piston.

* * * * *

UNITED STATES PATENT OFFICE
CERTIFICATE OF CORRECTION

PATENT NO. : 4,977,918
DATED : December 18, 1990
INVENTOR(S) : Julian S. Taylor

It is certified that error appears in the above-identified patent and that said Letters Patent is hereby corrected as shown below:

Column 4:

Claim 3, lines 3 and 4 of the claim, should read
"a pin means end portion guide coaxially supported by said piston rod and said cage disk."

Signed and Sealed this

Second Day of June, 1992

Attest:

DOUGLAS B. COMER

Attesting Officer

Acting Commissioner of Patents and Trademarks